(12) United States Patent
Hardacker et al.

(10) Patent No.: US 11,148,552 B2
(45) Date of Patent: Oct. 19, 2021

(54) POWER MANAGEMENT IN AN AUTOMOTIVE VEHICLE

(71) Applicant: QUALCOMM Incorporated, San Diego, CA (US)

(72) Inventors: Robert Hardacker, Fallbrook, CA (US); Alex Jong, San Diego, CA (US); Ralph Akram Gholmieh, San Diego, CA (US); Ravikumar Palakodety, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 16/215,597

(22) Filed: Dec. 10, 2018

(65) Prior Publication Data

US 2019/0176627 A1 Jun. 13, 2019

Related U.S. Application Data

(60) Provisional application No. 62/597,915, filed on Dec. 12, 2017.

(51) Int. Cl.
*B60L 58/00* (2019.01)
*B60L 58/20* (2019.01)
(Continued)

(52) U.S. Cl.
CPC ............ *B60L 58/20* (2019.02); *B60K 6/28* (2013.01); *B60L 3/0092* (2013.01); *B60L 53/00* (2019.02);
(Continued)

(58) Field of Classification Search
CPC . B60L 53/00; B60L 58/00; B60L 3/00; B60K 6/00; B60R 16/00; B60R 2021/00;
(Continued)

(56) References Cited

U.S. PATENT DOCUMENTS 5,780,992 A 7/1998 Beard
6,016,045 A 1/2000 Thomas et al.
(Continued)

FOREIGN PATENT DOCUMENTS

CN 104779420 A 7/2015
EP 3316446 A1 5/2018
(Continued)

OTHER PUBLICATIONS

Abracon Corporation: "ABX8XX Application Note Using Low Cost Ceramic Capacitors for RTC Backup Power", Jun. 20, 2013, 12 pages.

(Continued)

*Primary Examiner* — Hal Kaplan
*Assistant Examiner* — Joseph N Inge
(74) *Attorney, Agent, or Firm* — Holland & Hart LLP (57) ABSTRACT

An apparatus is disclosed. The apparatus comprises a primary power supply (PPS) configured to supply primary power, a PPS sensor configured to measure the power supplied by the PPS and provide a PPS measurement signal indicating an amount of the power supplied by the PPS, a backup power supply (BPS) configured to be provided in an emergency data system and further configured to supply backup power to a modem, and an integrated circuit configured to maintain a clock using the power supplied by the PPS. The integrated circuit is configured to receive the PPS measurement signal from the PPS sensor, determine whether the PPS measurement signal falls below a threshold, and maintain the clock using the power supplied by the BPS in response to a determination that the PPS measurement signal has fallen below the threshold.

12 Claims, 5 Drawing Sheets

(51) Int. Cl.
  *H02J 9/06* (2006.01)
  *H02J 7/00* (2006.01)
  *H02J 7/16* (2006.01)
  *B60K 6/28* (2007.10)
  *B60L 3/00* (2019.01)
  *B60L 53/00* (2019.01)
  *B60L 58/13* (2019.01)
  *H02J 7/14* (2006.01)
  *H01M 10/44* (2006.01)
  *B60R 16/033* (2006.01)
  *H01M 10/48* (2006.01)
  *G06F 1/14* (2006.01)
  *H01M 10/42* (2006.01)
  *B60R 21/00* (2006.01)

(52) U.S. Cl.
  CPC ............ *B60L 58/13* (2019.02); *B60R 16/033* (2013.01); *G06F 1/14* (2013.01); *H01M 10/4221* (2013.01); *H01M 10/44* (2013.01); *H01M 10/443* (2013.01); *H01M 10/48* (2013.01); *H01M 10/486* (2013.01); *H02J 7/0068* (2013.01); *H02J 7/0091* (2013.01); *H02J 7/007184* (2020.01); *H02J 7/1423* (2013.01); *H02J 7/1461* (2013.01); *H02J 7/1492* (2013.01); *H02J 7/16* (2013.01); *H02J 9/061* (2013.01); *B60R 2021/0027* (2013.01); *B60Y 2200/91* (2013.01); *B60Y 2200/92* (2013.01); *B60Y 2300/91* (2013.01); *H01M 2220/20* (2013.01)

(58) Field of Classification Search
  CPC .. H02M 10/4221; H02J 7/00; H01M 2200/20; B60Y 2300/00
  See application file for complete search history.

(56) References Cited

U.S. PATENT DOCUMENTS

| | | | |
|---|---|---|---|
| 6,020,082 | A | 2/2000 | Orlando |
| 6,043,631 | A | 3/2000 | Tsenter |
| 6,169,942 | B1 | 1/2001 | Miller et al. |
| 8,207,633 | B2 | 6/2012 | Oleksiewicz et al. |
| 9,438,073 | B2 | 9/2016 | Kamiyama et al. |
| 2006/0108972 | A1* | 5/2006 | Araya ................. H01M 10/482 320/106 |
| 2008/0315843 | A1 | 12/2008 | Bhardwaj |
| 2011/0022520 | A1* | 1/2011 | Ginter .................... G06Q 40/12 705/51 |
| 2014/0001861 | A1* | 1/2014 | Mann ........................ G06F 1/30 307/66 |
| 2014/0008984 | A1* | 1/2014 | Kamiyama ............... H02J 9/06 307/64 |
| 2014/0148975 | A1* | 5/2014 | Self ........................ F25B 19/00 701/2 |
| 2014/0288781 | A1* | 9/2014 | Horiguchi ............ G08B 29/181 701/45 |
| 2017/0069144 | A1* | 3/2017 | Lawrie-Fussey ...... G06Q 10/20 |

FOREIGN PATENT DOCUMENTS

| | | |
|---|---|---|
| WO | 9627155 A2 | 9/1996 |
| WO | 2015100397 A1 | 7/2015 |

OTHER PUBLICATIONS

Pressebox: "Epson RA890 Automotive DTCXO RTC", Epson Europe Electronics GmbH—Press release, 2018, 2 pages.
International Search Report and Written Opinion—PCT/US2018/065004—ISA/EPO—dated Apr. 18, 2019.

* cited by examiner

POWER MANAGEMENT IN AN AUTOMOTIVE VEHICLE

CROSS-REFERENCE TO RELATED APPLICATION

The present Application for Patent claims the benefit of U.S. Provisional Patent Application No. 62/597,915, entitled "POWER MANAGEMENT IN AN AUTOMOTIVE VEHICLE," filed Dec. 12, 2017, and assigned to the assignee hereof and hereby expressly incorporated herein by reference in its entirety.

INTRODUCTION

Aspects of this disclosure relate generally to automotive vehicles, and more particularly to automotive vehicle power management.

A conventional automotive vehicle includes a primary power source, for example, a battery. Typically, the primary power source is depleted when used to start the vehicle (or to perform any other electrical function) and then recharged by the engine once the vehicle is running. For example, many cabin features—dashboard indicators, infotainment system, power-assist for windows, locks, etc.—also rely on the primary battery for power.

If the primary power source runs down or gets disconnected, vehicle features lose power and cease to function. For example, when the primary power source is replaced, clock maintenance functionality cannot be maintained. Once power is restored to vehicle (for example, by recharging or replacing a battery), the clock must be reset. Solutions are needed for maintaining clock maintenance functionality in the absence of a power supply from the primary battery.

SUMMARY

The following summary is an overview provided solely to aid in the description of various aspects of the disclosure and is provided solely for illustration of the aspects and not limitation thereof.

In accordance with aspects of the disclosure, an apparatus is disclosed. The apparatus may comprise, for example, a primary power supply (PPS) configured to supply primary power, a PPS sensor configured to measure the power supplied by the PPS and provide a PPS measurement signal indicating an amount of the power supplied by the PPS, a backup power supply (BPS) configured to be provided in an emergency data system and further configured to supply backup power to a modem, and an integrated circuit configured to maintain a clock using the power supplied by the PPS. The integrated circuit is configured to receive the PPS measurement signal from the PPS sensor, determine whether the PPS measurement signal falls below a threshold, and maintain the clock using the power supplied by the BPS in response to a determination that the PPS measurement signal has fallen below the threshold.

In accordance with other aspects of the disclosure, a method is disclosed. The method may comprise, for example, maintaining, with an integrated circuit, a clock using power supplied by a primary power supply (PPS), measuring, with a PPS sensor, the power supplied by the PPS, providing, with the PPS sensor, a PPS measurement signal indicating an amount of the power supplied by the PPS, determining, with the integrated circuit, whether the PPS measurement signal falls below a threshold, and maintaining the clock using power supplied by a backup power supply (BPS) in response to a determination that the PPS measurement signal has fallen below the threshold, wherein the BPS is configured to be provided in an emergency data system and further configured to supply backup power to a modem.

In accordance with aspects of the disclosure, another apparatus is disclosed. The apparatus may comprise, for example, a primary power supply (PPS) and an integrated circuit. The PPS may be configured to supply a PPS signal and a PPS profile signal, wherein the PPS signal is configured to supply power and the PPS profile signal indicates one or more characteristics of the PPS. The integrated circuit may be configured to receive the PPS signal and the PPS profile signal from the PPS, operate using the supply power associated with the PPS signal, determine the one or more characteristics of the PPS based on the PPS profile signal, and manage power based on the determined one or more characteristics.

In accordance with other aspects of the disclosure, another method is disclosed. The method may comprise, for example, supplying, with a primary power supply (PPS), a PPS signal and a PPS profile signal, wherein the PPS signal is configured to supply power and the PPS profile signal indicates one or more characteristics of the PPS, receiving, with an integrated circuit, the PPS signal and the PPS profile signal from the PPS, operating, with the integrated circuit, using the supply power associated with the PPS signal, determining, with the integrated circuit, the one or more characteristics of the PPS based on the PPS profile signal, and managing, with the integrated circuit, power based on the determined one or more characteristics.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
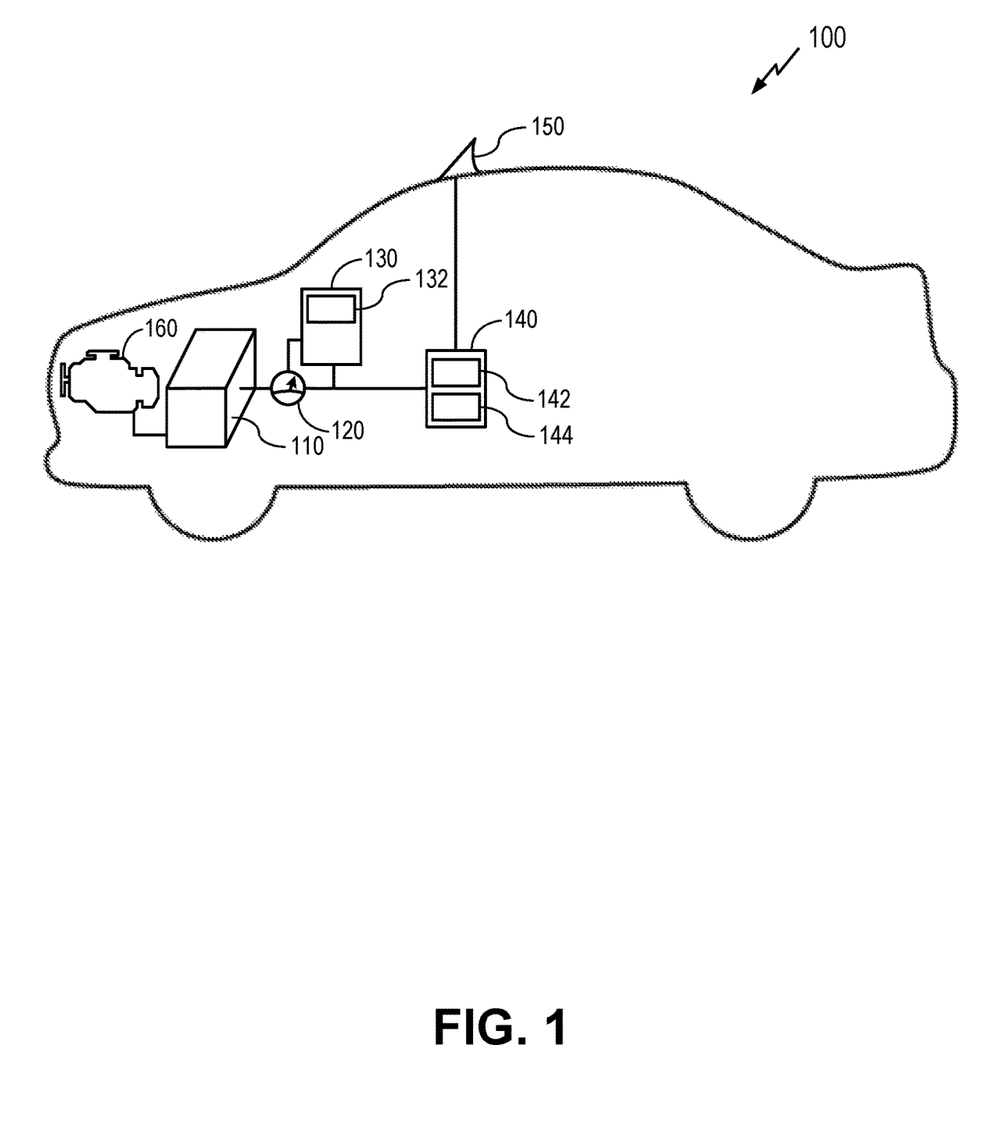
FIG. 1 generally illustrates a vehicle in accordance with aspects of the disclosure.

FIG. 1 generally illustrates a vehicle 100 in accordance with aspects of the disclosure.

The vehicle 100 may include a PPS 110 (where "PPS" is an abbreviation of "primary power supply"), a PPS sensor 120, an IC 130 (where "IC" is an abbreviation of integrated circuit), an emergency data system 140, an antenna 150, and an engine 160.

The PPS 110 may be, for example, a battery. The PPS 110 may supply the power used to light the dashboard and headlamps, operate power windows and power locks, start the engine 160 of the vehicle 100, etc.

The PPS sensor 120 may be configured to measure the power supplied by the PPS 110 and provide a PPS measurement signal indicating an amount of the power supplied by the PPS 110. In some implementations, the PPS sensor 120 may be a voltmeter. The PPS measurement signal may be generated by the PPS sensor 120 and provided to, for example, the IC 130.

The IC 130 may be, for example, an integrated circuit, a power management IC (PMIC), a system-on-chip (SoC), and/or any component thereof. The IC 130 may be configured to receive the PPS measurement signal from the PPS sensor 120, as will be described in greater detail below. The IC 130 may further include a clock 132. The clock 132 may be used to track the time of day, which may be displayed to an operator of the vehicle 100 (on, for example, the dashboard), or used for any other application that requires a timing measurement. In some implementations, the IC 130 may comprise a secure processor. In other implementations, a secure processor may be provided elsewhere in the vehicle 100. In either case, repeated loss of the power supplied to the secure processor (and/or repeated loss of accurate timing information from the clock 132) may cause a malfunction of the secure processor. The secure processor may typically be inaccessible to the end user, and may be configured to support financial transactions, digital rights management (DRM) for premium content, or any other suitable secure executions. For example, if an end user purchases the rights to view a movie for one week, the secure processor may be configured to perform the purchase transaction. Moreover, at the expiration of one week, the secure processor would deactivate viewing in order to ensure that digital rights are respected. If the secure processor were accessible to the end user, then the end user may be able to manipulate the clock that the secure processor relies on to perform many of its functions. The secure processor may have non-volatile memory (NVM) configured to store a finite series of power failures where the last known time could be stored. At power restoration the new time could be compared to the stored time to ensure time didn't go backwards. However, the clock time maintenance described in the present application may be preferable relative to, for example, enlargement of an on-die NVM memory.

If the power supplied by the PPS 110 is interrupted, the IC 130 may not be able to maintain the clock 132. An accurate clock may be a pre-requisite for any number of important functions, including security purposes. In conventional implementations, the operator of the vehicle 100 must manually set the clock 132 after every power interruption (which may be due to maintenance, overuse, etc.). However, as will be discussed in greater detail below, the method 200 depicted in FIG. 2 may enable the IC 130 to maintain the clock 132 even in the event that the power supplied by the PPS 110 is interrupted.

The emergency data system 140 may include a modem 142 and a BPS 144 (where "BPS" is an abbreviation of "backup power supply"). In some implementations, the emergency data system 140 may include a resilient housing that is designed to protect the modem 142 (and other critical components of the emergency data system 140) from damage, and remain in operation during an emergency (for example, when the car has been in an accident). The modem 142 may be coupled to the antenna 150, and if the vehicle 100 is in an accident, the modem 142 and antenna 150 may be used to contact emergency services and relay relevant data thereto.

In some implementations, the engine 160 may be, for example, an internal combustion engine. Power supplied by the PPS 110 may be used to start the engine 160. After the engine 160 is running, the power generated by the engine 160 may be used to re-charge the PPS 110 and/or the BPS 144.

In other implementations, the engine 160 may be replaced and/or augmented with other power sources. For example, if the vehicle 100 is a hybrid vehicle, then the vehicle 100 may include a plurality of power sources (for example, batteries). If the vehicle 100 is an electric vehicle, then the engine 160 may be omitted and replaced by a plurality of power sources (for example, batteries). In either case, the vehicle 100 has a PPS 110 that supplies power to the IC 130, emergency data system 140, and other components of the vehicle 100.

Figure 2:
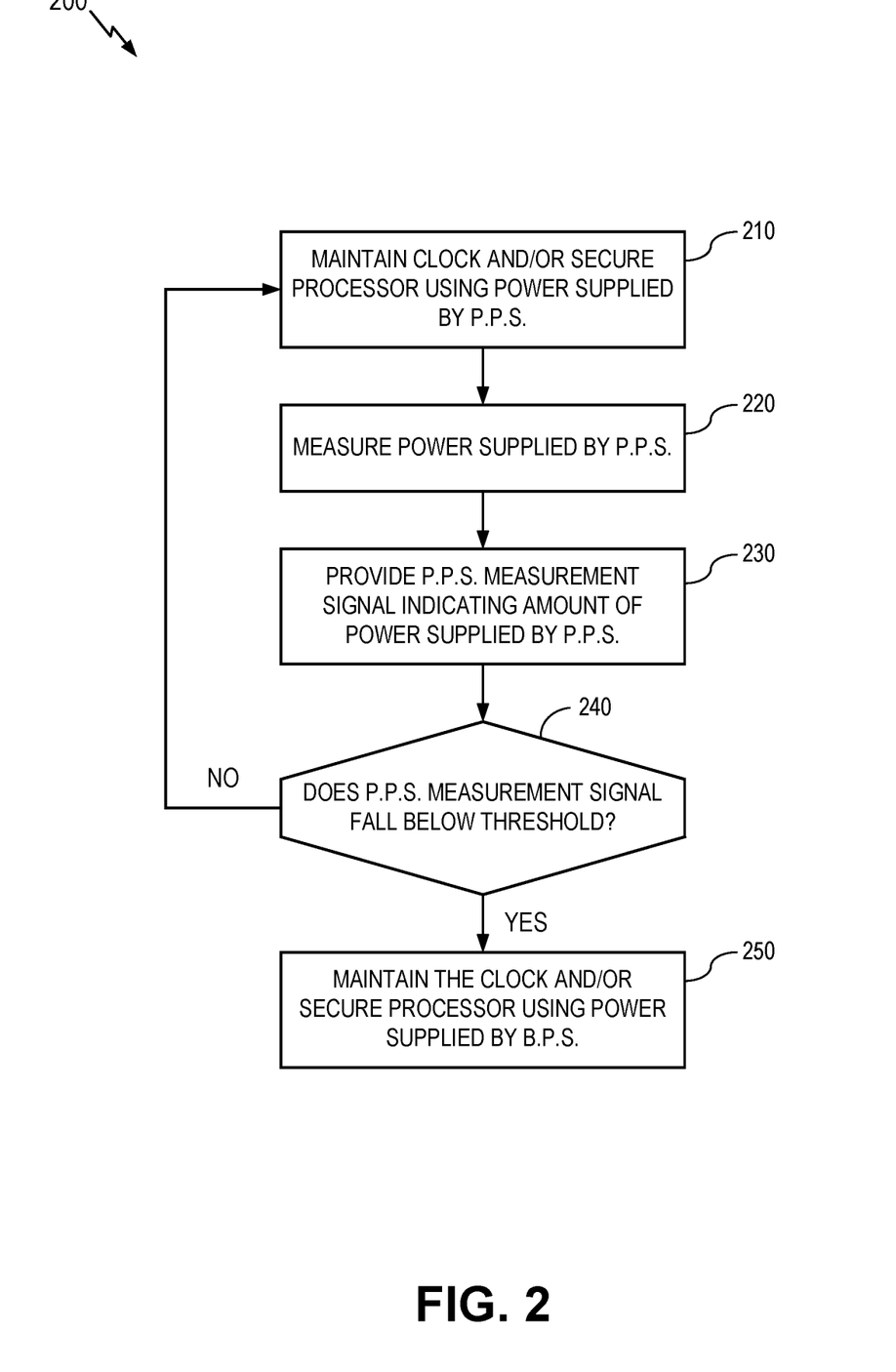
FIG. 2 generally illustrates a method of maintaining a clock.

FIG. 2 generally illustrates a method of maintaining a clock, for example, the clock 132 depicted in FIG. 1.

At 210, the method 200 maintains the clock 132 and/or a secure processor using power supplied by the PPS 110. The maintaining at 210 may be performed by, for example, the IC 130 depicted in FIG. 1.

At 220, the method 200 measures the power supplied by the PPS 110. The measuring at 220 may be performed by, for example, the PPS sensor 120 depicted in FIG. 1.

At 230, the method 200 provides a PPS measurement signal indicating an amount of power supplied by the PPS 110. The providing at 230 may be performed by, for example, a PPS sensor analogous to the PPS sensor 120 depicted in FIG. 1. The PPS measurement signal may be provided to, for example, the IC 130. As noted above, in some implementations, the PPS sensor 120 may include a voltmeter. The voltmeter may be used to monitor the voltage of the PPS 110.

At 240, the method 200 determines whether the PPS measurement signal falls below a threshold. If the PPS measurement signal does not fall below the threshold ('no' at 240), then the method 200 returns to the maintaining at 210 and the method 200 continues to maintain the clock 132 using power supplied by the PPS 110. If the PPS measurement signal falls below the threshold ('yes' at 240), then the method 200 proceeds to 250.

At 250, the method 200 maintains the clock 132 and/or the secure processor using power supplied by the BPS 144. The transition from the PPS 110 to the BPS 144 may be performed using a switch. The switch may open the electrical path to the PPS 110 and/or close the electrical path to the BPS 144. The switch may do the reverse if the PPS sensor 120 determines that the power supplied by the PPS 110 has been restored.

In the event that the power supplied by the PPS 110 is interrupted, the method 200 may be performed in order to maintain functioning of the secure processor and/or avoid the necessity of manually resetting the clock 132 upon restoration of the primary power supply.

Figure 3:
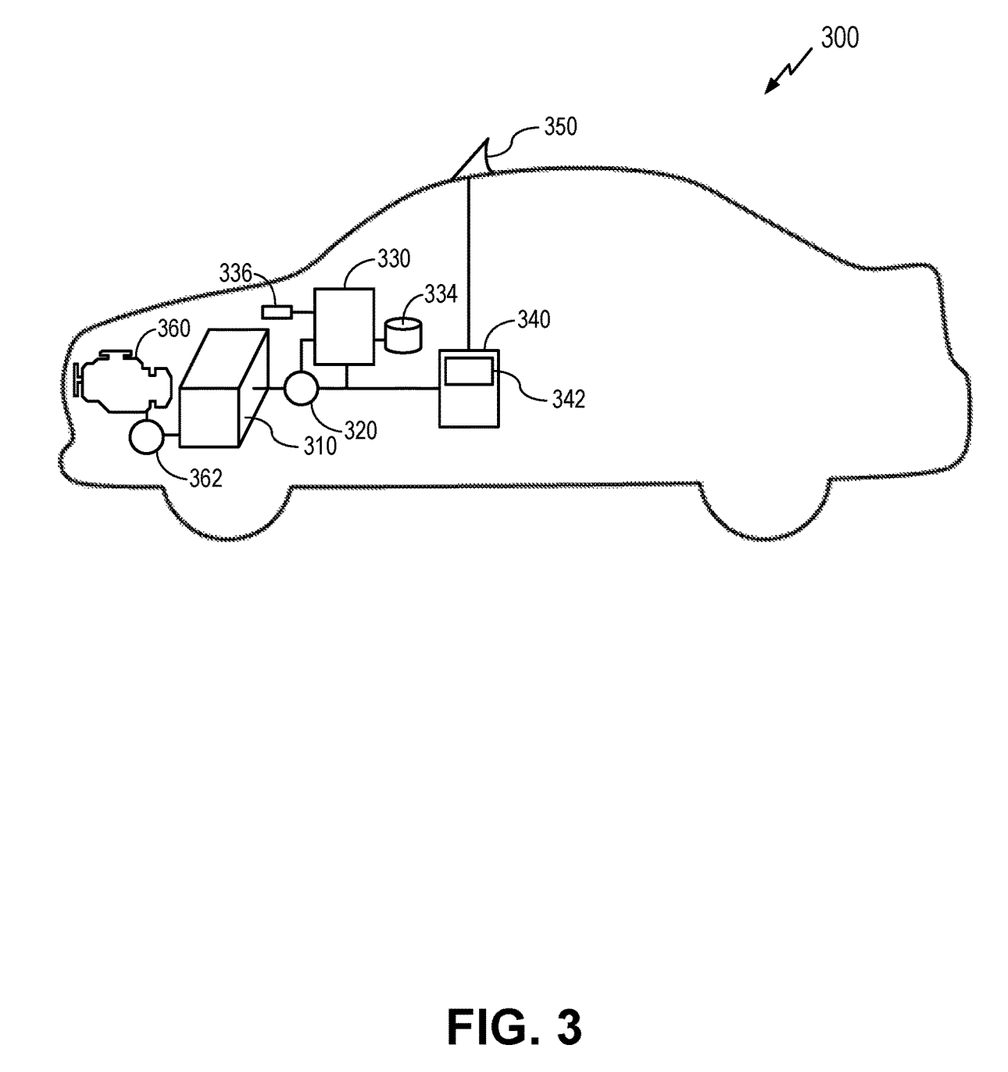
FIG. 3 generally illustrates another vehicle in accordance with aspects of the disclosure.

FIG. 3 generally illustrates a vehicle 300 in accordance with aspects of the disclosure.

The vehicle 300 may include a PPS 310, a PPS sensor 320, an IC 330, an emergency data system 340, an antenna 350, and an engine 360.

The PPS 310 may be analogous to the PPS 110. Accordingly, the PPS 310 may supply the power used to light the dashboard and headlamps, operate power windows and power locks, start the engine 360 of the vehicle 300, etc.

The PPS sensor 320 may be analogous in some respects to the PPS sensor 120. For example, the PPS sensor 320 may be configured to measure a voltage of the PPS 110. However, the PPS sensor 320 may be further configured to sense PPS profile data, as will be discussed in greater detail below with reference to FIG. 4.

The IC 330 may be analogous in some respects to the IC 130. The IC 330 may be configured to receive the PPS profile data from the PPS sensor 320. The IC 330 may be coupled to a database 334 and/or one or more sensors 336.

The database 334 may be used by the IC 330 to store the PPS profile data provided by the PPS sensor 320. In some conventional implementations, the power supply signal is a relatively static direct current ("DC") voltage. However, in accordance with aspects of the disclosure, the PPS profile data may be superimposed, encoded, etc., on the direct current generated by the PPS 310 and used to power the vehicle 300. Additionally or alternatively, the PPS profile data is communicated from the PPS 310 to the IC 330 by any suitable method, for example, Bluetooth, Bluetooth Low-Energy, WiFi, radio frequency identification ("RFID"), etc.

The one or more sensors 336 may provide sensor data. The database 334 may be used by the IC 330 to store the sensor data received from the one or more sensors 336. The one or more sensors 336 may include one or more temperature sensors, one or more accelerometers, one or more accident detectors (for example, airbag deployment sensors), and/or any other suitable sensors.

The emergency data system 340 may be analogous to the emergency data system 140 and may include a modem 342 analogous to the modem 142. Accordingly, the emergency data system 340 may include a resilient housing that is designed to protect the modem 342 (and other critical elements of the emergency data system 340) from damage, and remain in operation during an emergency (for example, when the car has been in an accident). The modem 342 may be coupled to the antenna 350, and if the vehicle 300 is in an accident, the modem 342 and antenna 350 may be used to contact emergency services and relay relevant data thereto.

In some implementations, PPS profile data, sensor data, or any other data may be received by the antenna 350 and provided to the modem 342. In accordance with the present disclosure, the PPS profile data and/or sensor data (or portions thereof) may be obtained from external databases (for example, a remote server), external sensors (i.e., not associated with the vehicle 300), etc.

The engine 360 may be, for example, an internal combustion engine. Power supplied by the PPS 310 may be used to start the engine 360. After the engine 360 is running, the power generated by the engine 360 may be used to re-charge the PPS 310. A regulator 362 may regulate the power used to re-charge the PPS 310. As will be discussed in greater detail below, the regulator 362 may be controlled by, for example, the IC 130.

In another implementation, the engine 360 may be omitted or augmented with other power sources. For example, if the vehicle 300 is a hybrid vehicle, then the vehicle 300 may include a plurality of power sources (for example, batteries). If the vehicle 300 is an electric vehicle, then the engine 360 may be omitted and replaced by a plurality of power sources (for example, batteries). In either case, the vehicle 300 has a PPS 310 that supplies power to the IC 330, emergency data system 340, and other components of the vehicle 300.

Figure 4:
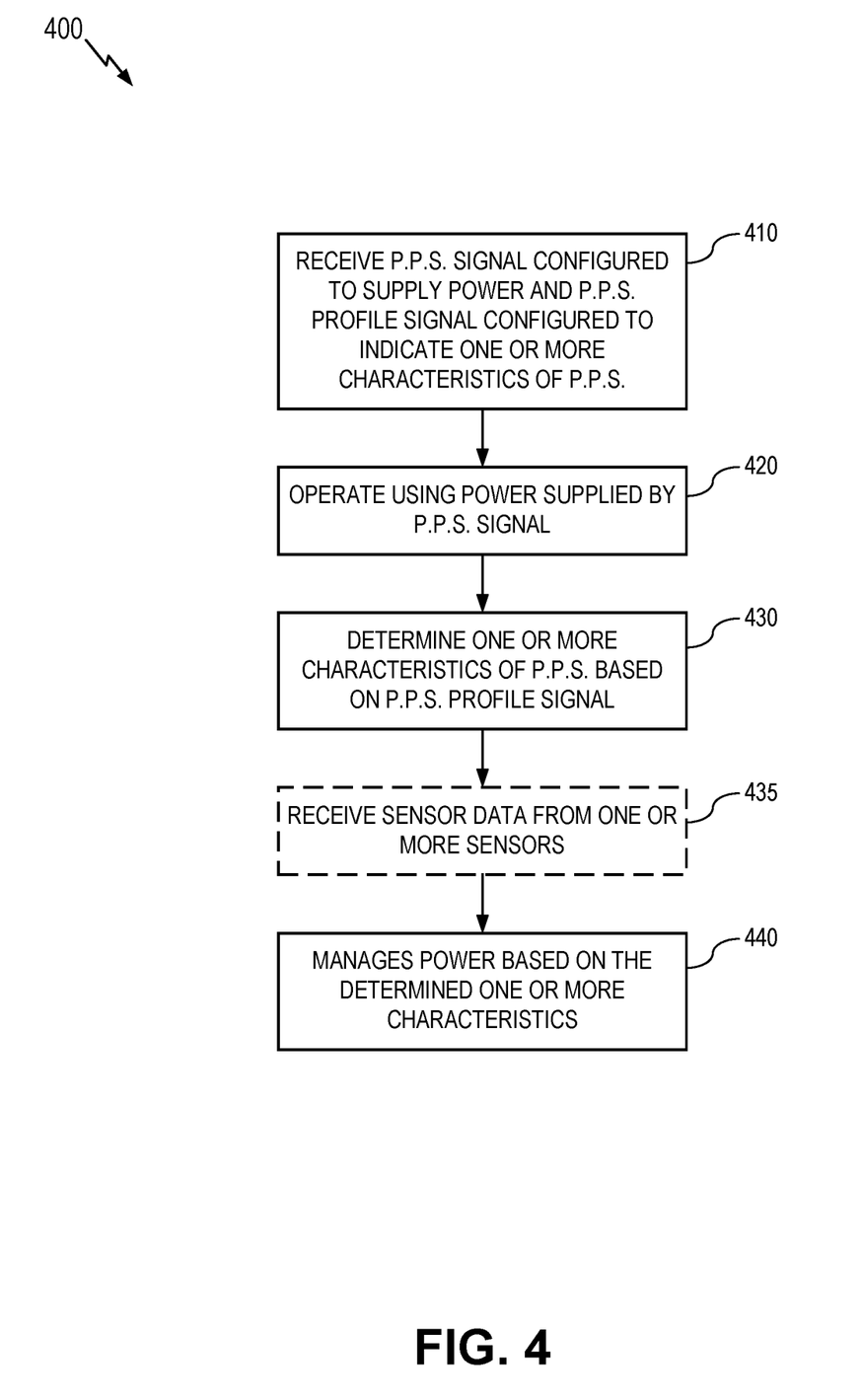
FIG. 4 generally illustrates a method of controlling power management.

FIG. 4 generally illustrates a method 400 of controlling power management.

At 410, the method 400 receives from the PPS 310 a PPS signal configured to supply power and a PPS profile signal configured to indicate one or more characteristics of the PPS 310. The receiving may be performed by, for example, the IC 330. The PPS profile signal may be superimposed on the PPS signal, encoded within the PPS signal, or otherwise included in the PPS signal.

The PPS profile signal may include PPS profile information that includes, for example, identifiers for the manufacturer, the model, the part number, and/or the serial number of the PPS 310. Additionally or alternatively, the PPS profile information may include, for example, PPS usage information, for example, a length of time since the battery was installed, an amount of power provided to the vehicle, an amount of recharge power received, etc. Additionally or alternatively, the PPS profile information may include, for example, one or more charging profiles associated with the PPS 310. The charging profiles may specify any combination of conditions and/or charge characteristics. For example, the charging profiles may identify a voltage, rate of voltage change, charging current, or rate of current change that is optimal for the PPS 310. In some implementations, the charging profile may vary with the temperature and/or the voltage of the PPS 310. For example, a first charging voltage may be optimal when it is cold, and a second charging voltage (different from the first charging voltage) may be optimal when it is hot. In this scenario, the charging profile may be modeled as an algebraic expression with temperature as a variable.

At 420, the method 400 operates using the power supplied by the PPS signal. The operating at 420 may be performed by, for example, the IC 330.

At 430, the method 400 determines one or more characteristics of the PPS 310 based on the PPS profile signal.

At 435, the method 400 optionally receives sensor data provided by the one or more sensors 336. To return to an earlier example, the sensor data may include a current temperature. The receiving at 430 may be performed by, for example, the IC 330.

At 440, the method 400 manages power based on the one or more characteristics (determined at 430) and/or the sensor data (received at 435). To return to an earlier example, the managing at 440 may comprise determining an optimal charging signal (for example, an optimal charging current or other suitable characteristic) and causing the engine 360 to provide the optimal charging current to the PPS 310 (for example, by providing an indication of the optimal values to the regulator 362). The managing may be performed by, for example, the IC 330. The regulator 362 may receive the indication of the optimal values, and may control the charging current (or other characteristic) of the power supplied to the PPS 310 by the engine 360.

Figure 5:
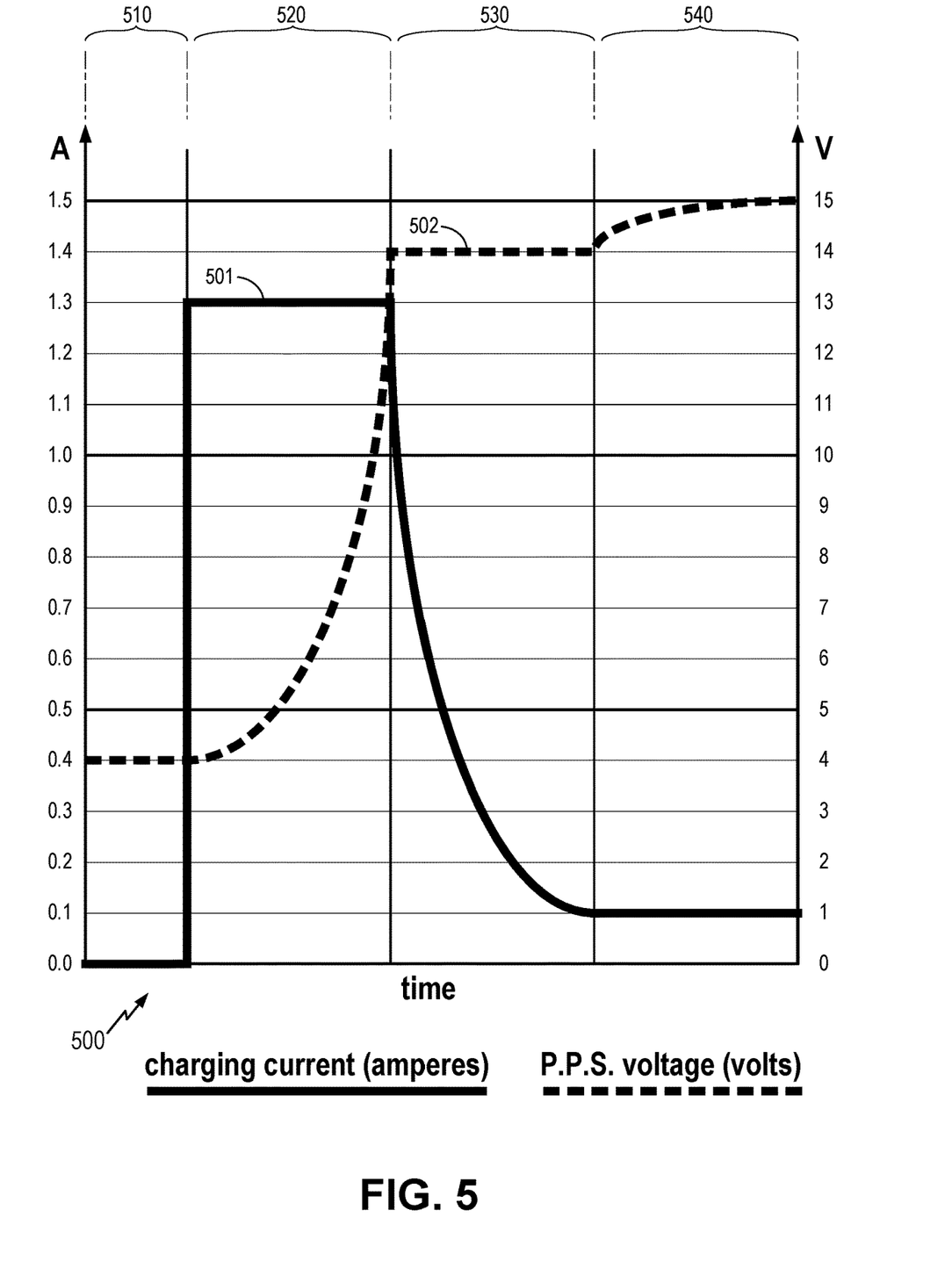
FIG. 5 generally illustrates a charging profile for a PPS.

FIG. 5 generally illustrates a charging profile 500 for a PPS, for example, the PPS 310. As noted above, the charging profile 500 may be included in the PPS profile data. The charging profile 500 may indicate a maximum recommended voltage of the PPS 310 (for example, 15V), a preferred charging current (for example, 1.3 A), and one or more trigger voltages (for example, 14V) that trigger a change in the preferred charging current (for example, 0.1 A). It will be appreciated that the charging profile will vary based on the type and capacity of the battery and may additionally be influenced by other environmental and battery specific conditions.

The charging profile 500 shows a charging current 501, indicated by a thick line, and a PPS voltage 502, indicated by a thick dashed line. In an initial state 510, the PPS 310 has a voltage of 4V and is not receiving a charge current. The voltage may be higher or lower than 4V and it will be understood that the particular values identified in the description of FIG. 5 may, in some implementations, be any suitable value. The IC 330 may be configured to detect an error if, for example, the voltage of the PPS 310 is below a threshold voltage, a resistance of the PPS 310 is above a threshold resistance, or a temperature of the PPS 310 or its environment is below a minimum temperature or above a maximum temperature. The IC 330 may be further configured to provide error notifications based on the detected errors.

The IC 330 may determine that the PPS voltage 502 of the PPS 310 (for example, the voltage in the initial state 510) is below a minimum voltage threshold (for example, 14V). The determination may be based on, for example, a signal from the PPS sensor 320. Accordingly, the IC 330 may perform power management by commanding the regulator 362 to provide a charge current to the PPS 310. In some implementations, the IC 330 may perform power management only if there is no error detected by the IC 330.

The regulator 362 may respond by increasing a level of the charging current 501 to a bulk charging current. The charging current 501 may be provided to the PPS 310 during a bulk charging period 520. During the bulk charging period 520, the PPS voltage 502 may rise in response to the increase in the charging current 501. The bulk charging 520 may end when the PPS voltage 502 reaches a trigger voltage, for example, a minimum recommended operating voltage. The bulk charging 520 may also end if an error is detected. The IC 330 may be configured to detect an error if, for example, a temperature of the PPS 310 or its environment is below a minimum temperature or above a maximum temperature, or a bulk charging period timer has expired.

Following the bulk charging period 520 is an absorption charging period 530. During the absorption charging period 530, the amount of charging current 501 is reduced while the voltage is generally held constant. In the example of FIG. 5, the charging current 501 drops from 1.3 A to 0.1 A over the course of the absorption charging period 530. As noted above, transition from the bulk charging period 520 to the absorption charging period 530 may be triggered when the PPS voltage 502 reaches a trigger voltage (for example, 14V). For example, the PPS sensor 320 may sense the PPS voltage 502 and provide the results to the IC 330. The IC 330 may determine if the trigger voltage has been reached. In particular, when the PPS voltage 502 reaches (for example) 14V, the IC 330 may command the regulator 362 to reduce the charging current 501. In the example of FIG. 5, the charging current 501 drops to 0.1 A during the absorption charging period 530.

Following the absorption charging period 530 is a float charge period 540. During the float charge period 540, the IC 330 commands the regulator 362 to maintain the charging current 501 at a float charge current (0.1 A in the example of FIG. 5). In response to the float charge current, the PPS voltage 502 rises to a maximum recommended voltage (for example, 15V).

Although not shown, it will be understood that once the maximum recommended voltage is reached, the charging current 501 may be cut off (i.e., reduced to 0.0 A). It will be further understood that the process described above in relation to FIG. 5 may be repeated if the PPS voltage 502 ultimately falls back below the minimum voltage threshold.

As noted above, the charging profile 500 may be specific to a particular make or model of PPS 310. In addition, the charging profile 500 may be a dynamic charging profile wherein the particular values of the minimum voltage threshold, the bulk charging current, the trigger voltage, the float charge current, etc., vary in response to sensed conditions. For example, if the one or more sensors 336 include a thermometer, then temperature (for example, battery temperature, ambient temperature, etc.) may be the sensed condition. As the temperature varies, the particular values of one or more of the minimum voltage threshold, the bulk charging current, the trigger voltage, the float charge current, etc., may also vary. For example, if the temperature falls below ten degrees Celsius, then the optimal bulk charging current may increase or decrease. Accordingly, the charging profile 500 provides instructions for how the specified values should be modified, and what should be commanded in response to a particular sensed condition.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted in all cases as "based at least in part on" rather than, for example, "based solely on".

It will be understood that terms such as "top" and "bottom", "left" and "right", "vertical" and "horizontal", etc., are relative terms used strictly in relation to one another, and do not express or imply any relation with respect to gravity, a manufacturing device used to manufacture the components described herein, or to some other device to which the components described herein are coupled, mounted, etc.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not imply that there are only two elements and further does not imply that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium known in the art. As used herein the term "non-transitory" does not exclude any physical storage medium or memory and particularly does not exclude dynamic memory (e.g., RAM) but rather excludes only the interpretation that the medium can be construed as a transitory propagating signal. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. An apparatus, comprising:
a primary power supply (PPS) configured to supply power and a PPS profile signal indicating one or more characteristics of the PPS;
a PPS sensor configured to measure the power supplied by the PPS and provide a PPS measurement signal indicating an amount of the power supplied by the PPS;
a backup power supply (BPS) configured to be provided in an emergency data system and further configured to supply backup power to a modem; and
an integrated circuit configured to maintain a clock using the power supplied by the PPS, wherein the integrated circuit is configured to:
receive the PPS measurement signal from the PPS sensor;
determine whether the PPS measurement signal falls below a threshold;
maintain the clock using the power supplied by the BPS in response to a determination that the PPS measurement signal has fallen below the threshold; and
determine an optimum charging current based on the one or more characteristics of the PPS, wherein the optimum charging current is used to charge the PPS.

2. The apparatus of claim 1, further comprising a secure processor, wherein the BPS is further configured to supply the backup power to the secure processor.

3. The apparatus of claim 2, wherein the secure processor is inaccessible to a user of the apparatus and configured to perform at least one of secure transactions and manage digital rights based on a time value obtained from the clock.

4. The apparatus of claim 2, wherein the integrated circuit comprises the secure processor.

5. The apparatus of claim 1, wherein the PPS is further configured to recharge the BPS in response to a determination that the BPS is not fully charged.

6. The apparatus of claim 1, further comprising the emergency data system, wherein the emergency data system is configured to provide an automatic crash notification and comprises:
the BPS;
the modem;
a resilient housing, wherein the BPS and the modem are included within the resilient housing; and
an antenna.

7. A method, comprising:
supplying, by a primary power supply (PPS), power and a PPS profile signal indicating one or more characteristics of the PPS;
maintaining, with an integrated circuit, a clock using the power supplied by the PPS;
measuring, with a PPS sensor, the power supplied by the PPS;
providing, with the PPS sensor, a PPS measurement signal indicating an amount of the power supplied by the PPS;
determining, with the integrated circuit, whether the PPS measurement signal falls below a threshold;
maintaining the clock using power supplied by a backup power supply (BPS) in response to a determination that the PPS measurement signal has fallen below the threshold, wherein the BPS is configured to be provided in an emergency data system and further configured to supply backup power to a modem; and
determining, with the integrated circuit, an optimum charging current based on the one or more characteristics of the PPS, wherein the optimum charging current is used to charge the PPS.

8. The method of claim 7, wherein the BPS is further configured to supply the backup power to a secure processor.

9. The method of claim 8, wherein the secure processor is inaccessible to a user of an apparatus comprising the secure processor and configured to perform at least one of secure transactions and manage digital rights based on a time value obtained from the clock.

10. The method of claim 8, wherein the integrated circuit comprises the secure processor.

11. The method of claim 7, further comprising:
recharging the BPS in response to a determination that the BPS is not fully charged.

12. The method of claim 7, wherein the emergency data system is configured to provide an automatic crash notification and comprises:
the BPS;
the modem;
a resilient housing, wherein the BPS and the modem are included within the resilient housing; and
an antenna.

* * * * *